(12) United States Patent
Chae et al.

(10) Patent No.: US 9,967,062 B2
(45) Date of Patent: May 8, 2018

(54) METHOD AND APPARATUS FOR TRANSMITTING HARQ-ACK IN WIRELESS COMMUNICATION SYSTEM

(71) Applicant: LG ELECTRONICS INC., Seoul (KR)

(72) Inventors: Hyukjin Chae, Seoul (KR); Suckchel Yang, Seoul (KR); Hanbyul Seo, Seoul (KR); Seungmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 73 days.

(21) Appl. No.: 15/118,809

(22) PCT Filed: Feb. 16, 2015

(86) PCT No.: PCT/KR2015/001545
§ 371 (c)(1),
(2) Date: Aug. 12, 2016

(87) PCT Pub. No.: WO2015/122734
PCT Pub. Date: Aug. 20, 2015

(65) Prior Publication Data
US 2017/0054531 A1    Feb. 23, 2017

Related U.S. Application Data

(60) Provisional application No. 61/939,750, filed on Feb. 14, 2014.

(51) Int. Cl.
*H04L 1/18* (2006.01)
*H04W 72/04* (2009.01)
*H04L 5/00* (2006.01)
*H04L 5/14* (2006.01)

(52) U.S. Cl.
CPC .......... *H04L 1/1861* (2013.01); *H04L 5/0055* (2013.01); *H04W 72/042* (2013.01); *H04W 72/0413* (2013.01); *H04L 5/0057* (2013.01); *H04L 5/1469* (2013.01)

(58) Field of Classification Search
None
See application file for complete search history.

(56) References Cited

U.S. PATENT DOCUMENTS

2015/0215081 A1* 7/2015 Chae .................... H04L 5/0055
370/329

OTHER PUBLICATIONS

3GPP TSG RAN WG1 Samsung HARQ-ACK feedback procedures for eIMTA, submitted in the IDS by the applicant.*
Nokia PUCCH formats for HARQ-ACK feedback, submitted in the IDS by the Applicant.*

(Continued)

*Primary Examiner* — Andrew Lai
*Assistant Examiner* — Jamaal Henson
(74) *Attorney, Agent, or Firm* — Lee, Hong, Degerman, Kang & Waimey

(57) ABSTRACT

According to one embodiment of the present invention, a method for transmitting a hybrid automatic repeat request (HARQ)-ACK in a wireless communication system, comprises the steps of: determining a physical uplink control channel (PUCCH) resource for a plurality of downlink subframes using a HARQ-ACK resource offset (ARO); and transmitting HARQ-ACK from one uplink subframe via the PUCCH resource.

12 Claims, 12 Drawing Sheets

(56) References Cited

OTHER PUBLICATIONS

Qualcomm Incorporated, "eIMTA PUCCH Resource Allocation," 3GPP TSG-RAN WG1 #75, R1-135291, Nov. 2013, 4 pages.
Huawei, "HARQ-ACK PUCCH resource allocation," 3GPP TSG-RAN WG1 #76, R1-140021, Feb. 2014, 5 pages.
LG Electronics, "Remaining Details of HARQ Feedback for TDD eIMTA," 3GPP TSG-RAN WG1 #76, R1-140299, Feb. 2014, 4 pages.
Samsung, "HARQ-ACK feedback procedures for eIMTA," 3GPP TSG-RAN WG1 #76, R1-140351, Feb. 2014, 7 pages.
NSN, "PUCCH resource allocation for HARQ-ACK feedback," 3GPP TSG-RAN WG1 #76, R1-140544, Feb. 2014, 5 pages.
PCT International Application No. PCT/KR2015/001545, Written Opinion of the International Searching Authority dated May 14, 2015, 18 pages.
European Patent Office Application Serial No. 15749150.7, Search Report dated Sep. 6, 2017, 7 pages.
Samsung, "On PUCCH HARQ-ACK procedure for eIMTA", 3GPP TSG RAN WG1 Meeting #74bis, R1-134157, XP050717346, Oct. 2013, 5 pages.
Catt, "PUCCH resource allocation for TDD eIMTA", 3GPP TSG RAN WG1 Meeting #75, R1-135059, XP050734762, Nov. 2013, 4 pages.
NSN et al., "PUCCH formats for HARQ-ACK feedback", 3GPP TSG RAN WG1 Meeting #76, R1-140543, Feb. 2014, 3 pages.

* cited by examiner

FIG. 9
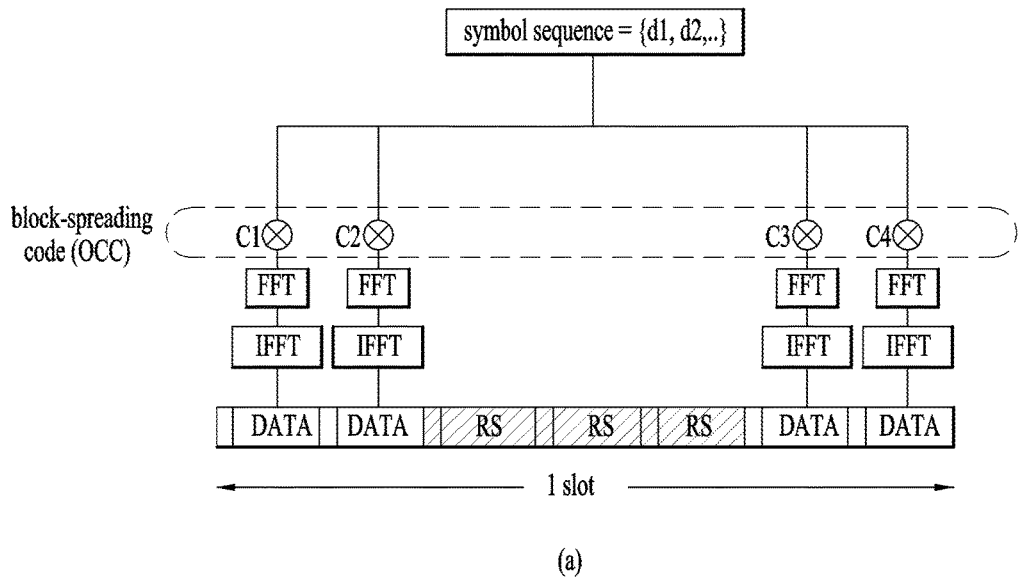
(a)
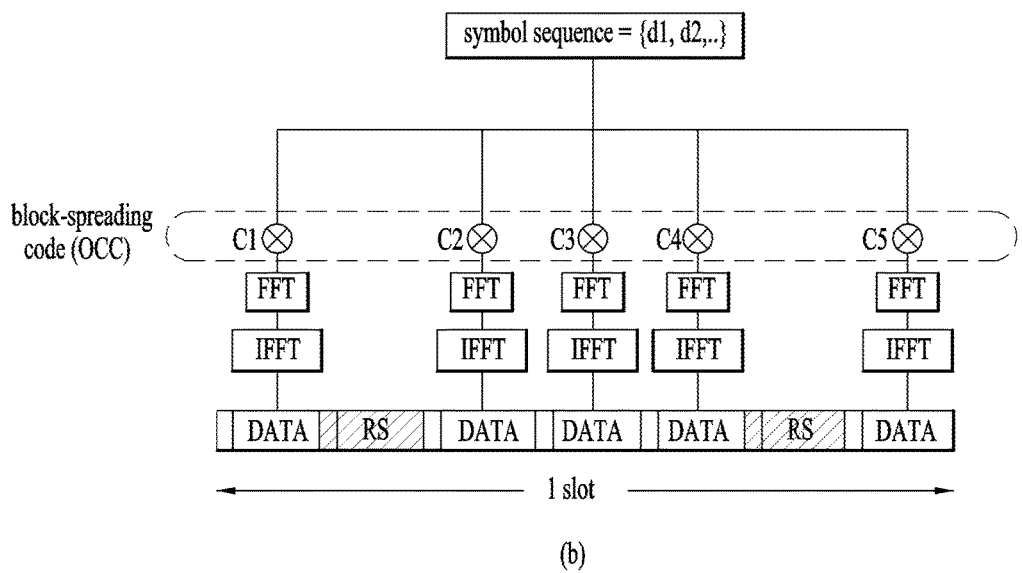
(b)

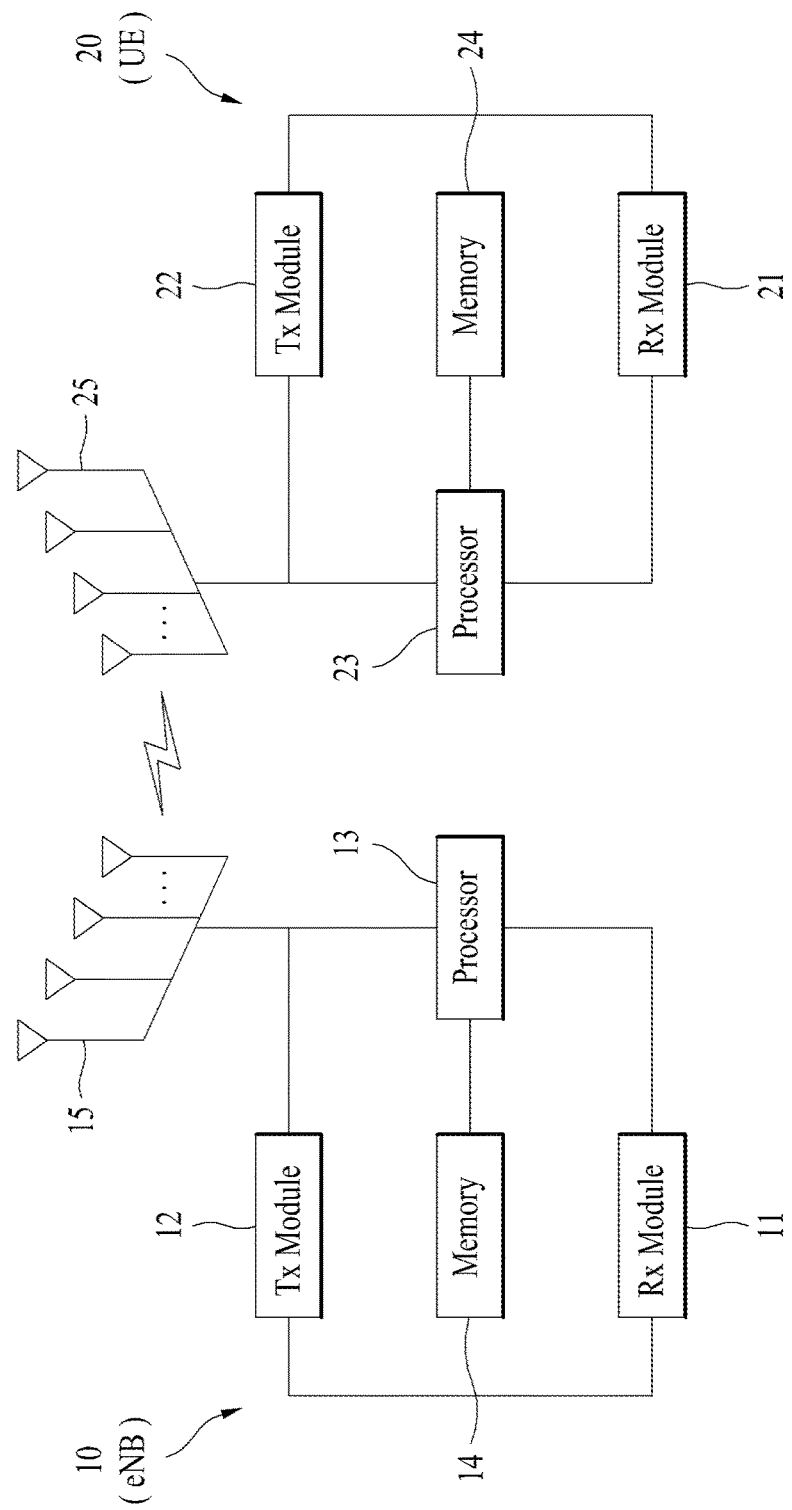

METHOD AND APPARATUS FOR TRANSMITTING HARQ-ACK IN WIRELESS COMMUNICATION SYSTEM

CROSS-REFERENCE TO RELATED APPLICATIONS

This application is the National Stage filing under 35 U.S.C. 371 of International Application No. PCT/KR2015/001545, filed on Feb. 16, 2015, which claims the benefit of U.S. Provisional Application No. 61/939,750, filed on Feb. 14, 2014, the contents of which are all hereby incorporated by reference herein in their entirety.

TECHNICAL FIELD

The present invention relates to a wireless communication system, and more particularly, to a method and apparatus for transmitting a Hybrid Automatic Repeat Request (HARQ)-Acknowledgement (ACK), when Enhanced Physical Downlink Channel (EPDCCH) and enhanced Interference Mitigation and Traffic Adaptation (eIMTA) are used.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to determine how to transmit an Acknowledgement (ACK), when enhanced Interference Mitigation and Traffic Adaptation (eIMTA) is configured for a User Equipment (UE).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting a Hybrid Automatic Repeat reQuest Acknowledgement (HARQ-ACK) in a wireless communication system includes determining Physical Uplink Control Channel (PUCCH) resources for a plurality of downlink subframes, using an HARQ-ACK Resource Offset (ARO), and transmitting HARQ-ACKs through the PUCCH resources in one uplink subframe. If the plurality of downlink subframes includes only subframes of a first subframe set common to an enhanced Interference Mitigation and Traffic Adaptation (eIMTA) User Equipment (UE) and a non-eIMTA UE, the ARO shifts a PUCCH resource for a first subframe included in the first subframe set to a PUCCH resource for a subframe preceding the first subframe. If the plurality of downlink subframes also includes a subframe of a second subframe set for the eIMTA UE only, the ARO shifts a PUCCH resource for a second subframe included in the second subframe set to a PUCCH resource for a subframe preceding the second subframe, and when the amount of PUCCH resources to be shifted for the second subframe is determined, the second subframe set is considered to include the subframes of the first subframe set.

The ARO may be set for each of the first subframe set and the second subframe set.

Different AROs may be set for the first and second subframe sets.

PUCCH resources for the first subframe set and PUCCH resources for the second subframe set may be contiguous.

If the plurality of downlink subframes include only subframes of the first subframe set common to the eIMTA UE and the non-eIMTA UE, the ARO may be $$-\sum_{i1=0}^{m-1} N_{ECCE,q,n-k_{i1}} - 2$$

where m represents the indexes of the plurality of downlink subframes, and $N_{eCCE,q,n-k_{i1}}$ represents the number of ECCEs of EPDCCH-PRB set q in subframe $n-k_{i1}$.

The PUCCH resources may be determined using a lowest of the indexes of Enhanced Control Channel Elements (ECCEs) in an Enhanced Physical Downlink Control Channel (EPDCCH).

In another aspect of the present invention, a UE for transmitting an HARQ-ACK in a wireless communication system includes a reception module, and a processor. The processor is configured to determine PUCCH resources for a plurality of downlink subframes, using an ARO, and transmit HARQ-ACKs through the PUCCH resources in one uplink subframe. If the plurality of downlink subframes includes only subframes of a first subframe set common to an eIMTA UE and a non-eIMTA UE, the ARO shifts a PUCCH resource for a first subframe included in the first subframe set to a PUCCH resource for a subframe preceding the first subframe. If the plurality of downlink subframes also includes a subframe of a second subframe set for the eIMTA UE only, the ARO shifts a PUCCH resource for a second subframe included in the second subframe set to a PUCCH resource for a subframe preceding the second subframe, and when the amount of PUCCH resources to be shifted for the second subframe is determined, the second subframe set is considered to include the subframes of the first subframe set.

The ARO may be set for each of the first subframe set and the second subframe set.

Different AROs may be set for the first and second subframe sets.

PUCCH resources for the first subframe set and PUCCH resources for the second subframe set may be contiguous.

If the plurality of downlink subframes include only subframes of the first subframe set common to the eIMTA UE and the non-eIMTA UE, the ARO may be $$-\sum_{i1=0}^{m-1} N_{ECCE,q,n-k_{i1}} - 2$$

where m represents the indexes of the plurality of downlink subframes, and $N_{eCCE,q,n-k_{i1}}$ represents the number of ECCEs of EPDCCH-PRB set q in subframe $n-k_{i1}$.

The PUCCH resources may be determined using a lowest of the indexes of ECCEs in an EPDCCH.

Advantageous Effects

According to the present invention, if eIMTA is applied to a UE, an ACK can be transmitted without collision between Physical Uplink Control Channel (PUCCH) resources, while increasing resource use efficiency.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 9 illustrates a structure of a PUCCH for block spreading;
FIG. 17 is a block diagram of a transmission apparatus and a reception apparatus.

BEST MODE FOR CARRYING OUT THE INVENTION

Figure 1:
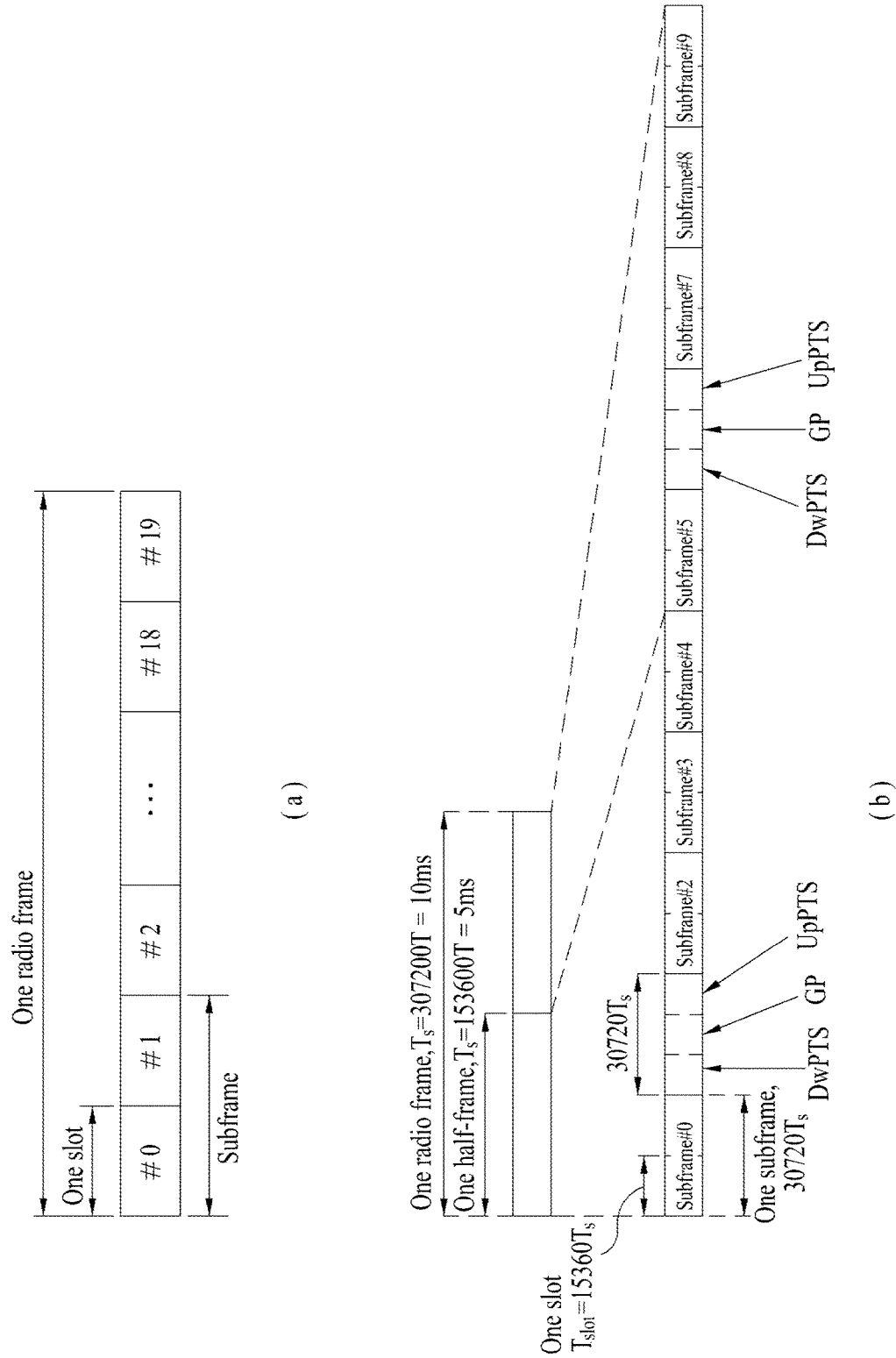
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "Base Station (BS)" may be replaced with terms such as "fixed station," "Node-B," "eNode-B (eNB)," and "access point". The term "relay" may be replaced with such terms as "Relay Node (RN)" and "Relay Station (RS)". The term "terminal" may also be replaced with such terms as "User Equipment (UE)," "a Mobile Station (MS)," "Mobile Subscriber Station (MSS)" and "Subscriber Station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be embodied through wireless technologies such as Universal Terrestrial Radio Access (UTRA) or CDMA2000. TDMA may be embodied through wireless technologies such as Global System for Mobile communication (GSM)/General Packet Radio Service (GPRS)/Enhanced Data rates for GSM Evolution (EDGE). OFDMA may be embodied through wireless technologies such as IEEE 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project (3GPP) Long Term Evolution (LTE) is a part of evolved UMTS (E-UMTS), which uses E-UTRA. 3GPP LTE employs OFDMA for downlink and employs SC- FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an Uplink (UL)/Downlink (DL) data packet is transmitted on a subframe basis, and one subframe is defined as a predetermined time interval including a plurality of OFDM symbols. 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into ten subframes. Each subframe includes two slots in the time domain. The time taken to transmit one subframe is defined as a Transmission Time Interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A Resource Block (RB), which is a resource allocation unit, may include a plurality of consecutive subcarriers in a slot.

The number of OFDM symbols included in one slot depends on the configuration of a Cyclic Prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a Physical Downlink Control Channel (PDCCH) and the other three OFDM symbols may be allocated to a Physical Downlink Shared Channel (PDSCH).

FIG. 1(b) illustrates the type-2 radio frame structure. The type-2 radio frame includes two half frames, each of which has 5 subframes, a Downlink Pilot Time Slot (DwPTS), a Guard Period (GP), and an Uplink Pilot Time Slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
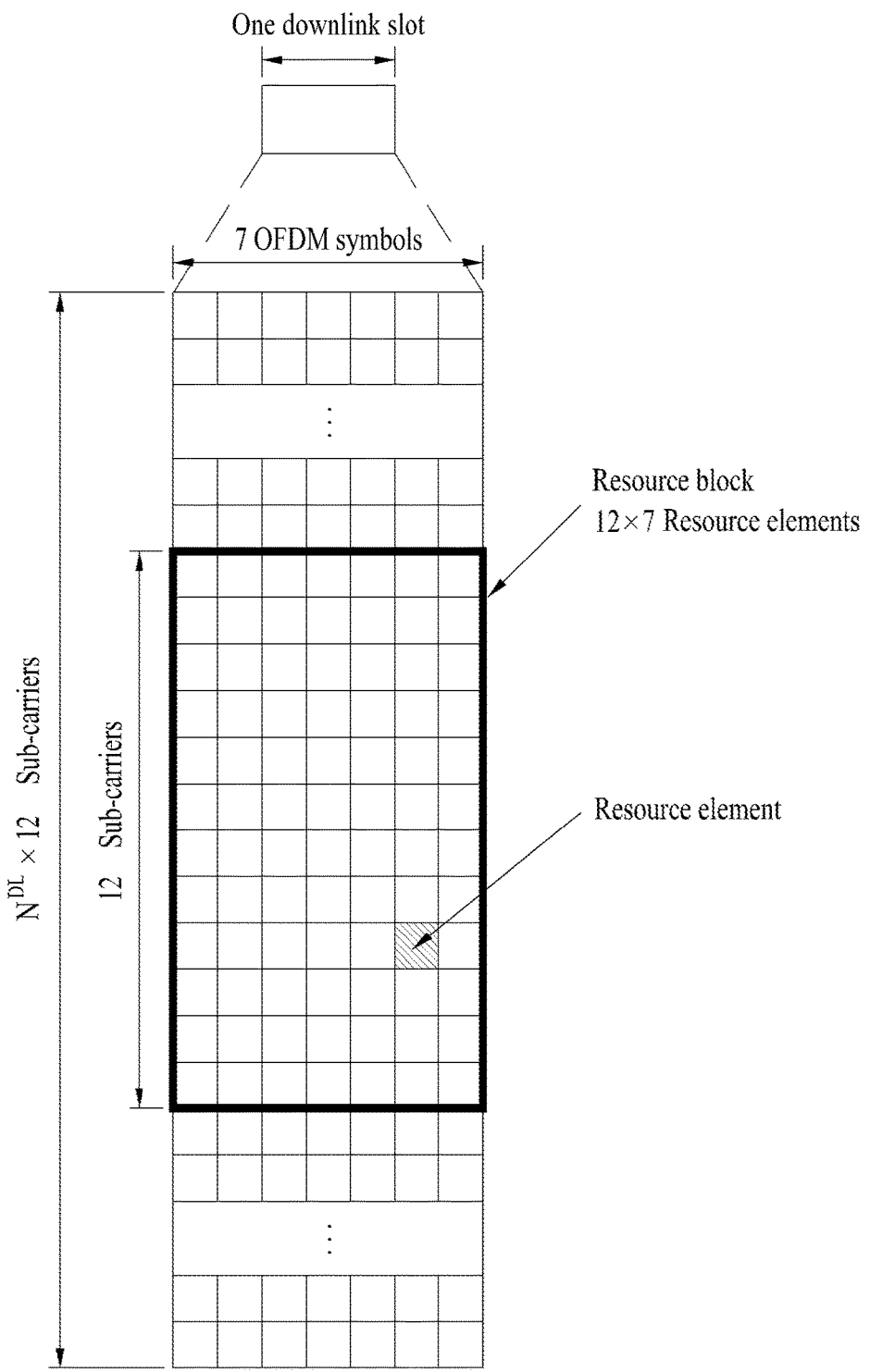
FIG. 2 illustrates a resource grid in a Downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a Resource Element (RE). An RB includes 12×7 REs. The number $N^{DL}$ of RBs includes in a DL slot depends on a DL transmission bandwidth. A UL slot may have the same structure as a DL slot.

Figure 3:
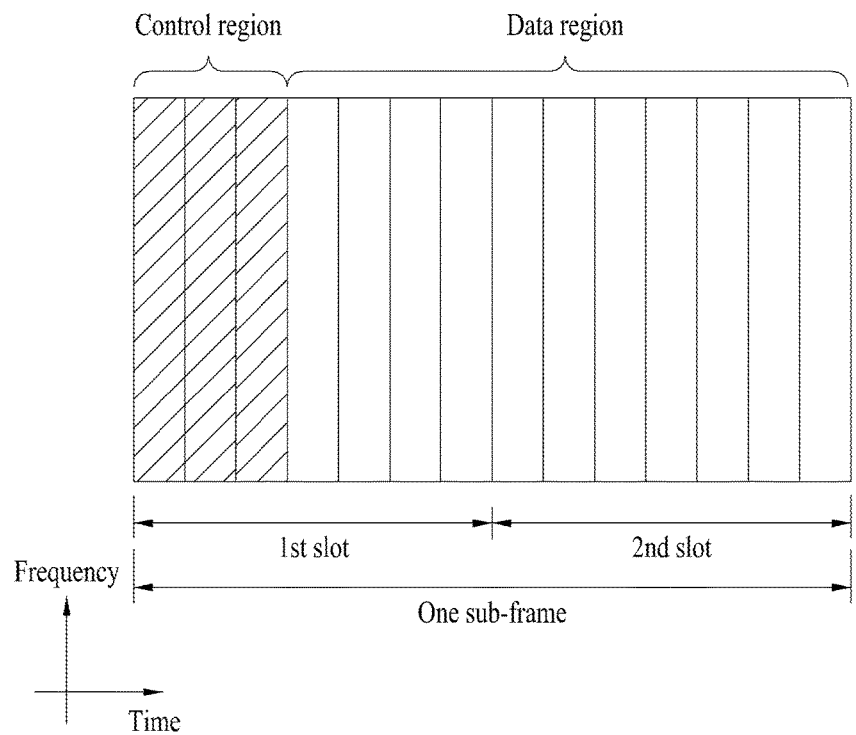
FIG. 3 illustrates a DL subframe structure.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a Physical Control Format Indicator Channel (PCFICH), a Physical Downlink Control Channel (PDCCH), and a Physical Hybrid Automatic Repeat reQuest (HARQ) Indicator Channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called Downlink Control Information (DCI). The DCI includes UL or DL scheduling information or UL transmission power control commands for UE groups. The PDCCH delivers information about resource allocation and a transport format for a DL Shared Channel (DL-SCH), resource allocation information about an UL Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, transmission power control information, and Voice over Internet Protocol (VoIP) activation information. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a Cyclic Redundancy Check (CRC) to the control information. The CRC is masked by an Identifier (ID) known as a Radio Network Temporary Identifier (RNTI) according to the owner or usage of the PDCCH. If the PDCCH is directed to a specific UE, its CRC may be masked by a Cell-RNTI (C-RNTI) of the UE. If the PDCCH is for a paging message, the CRC of the PDCCH may be masked by a Paging Indicator Identifier (P-RNTI). If the PDCCH delivers system information, particularly, a System Information Block (SIB), the CRC thereof may be masked by a system information ID and a System Information RNTI (SI-RNTI). To indicate that the PDCCH delivers a random access response in response to a random access preamble transmitted by a UE, the CRC thereof may be masked by a Random Access-RNTI (RA-RNTI).

Figure 4:
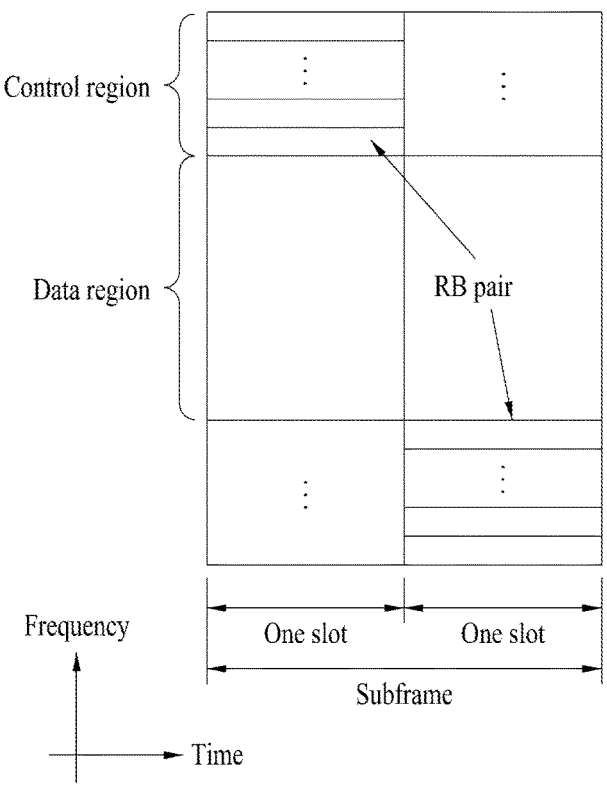
FIG. 4 illustrates an Uplink (UL) subframe structure.

FIG. 4 illustrates a UL subframe structure. A UL subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL Control Information (UCI) transmitted over a PUCCH may include a Scheduling Request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a Multiple Input Multiple Output (MIMO) scheme and include a Channel Quality Indicator (CQI), a Precoding Matrix Index (PMI), and a Rank Indicator (RI). The channel measurement information may be collectively referred to as CQI. 20 bits may be used per subframe to transmit CQI.

The PUCCH may be demodulated using a Binary Phase Shift Keying (BPSK) scheme and a Quadrature Phase Shift Keying (QPSK) scheme. Control information of a plurality of UEs may be transmitted over the PUCCH. When Code Division Multiplexing (CDM) is performed to distinguish between signals of UEs, Constant Amplitude Zero AutoCorrelation (CAZAC) with a length of 12 is mainly used. The CAZAC sequence has characteristics of maintaining a constant amplitude in the time domain and frequency domain and thus is suitable for reduction in Peak-to-Average Power Ratio (PAPR) or Cubic Metric (CM) of a UE to increase coverage. In addition, ACK/NACK information in response to DL data transmitted over a PUCCH is covered using an orthogonal sequence or Orthogonal Cover (OC).

In addition, control information transmitted on a PUCCH may be distinguished using cyclically shifted sequences having different Cyclic Shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a Reference Signal (RS) for coherent detection of PUCCH) that can be used to transmit the control information.

In 3GPP LTE, a PUCCH is defined in seven different formats according to transmitted control information, a modulation scheme and the amount of control information.

Attributes of transmitted uplink control information (UCI) for each PUCCH format may be summarized as shown in [Table 1].

TABLE 1

| PUCCH format | Modulation Scheme | Number of bits per subframe | Usage | Etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
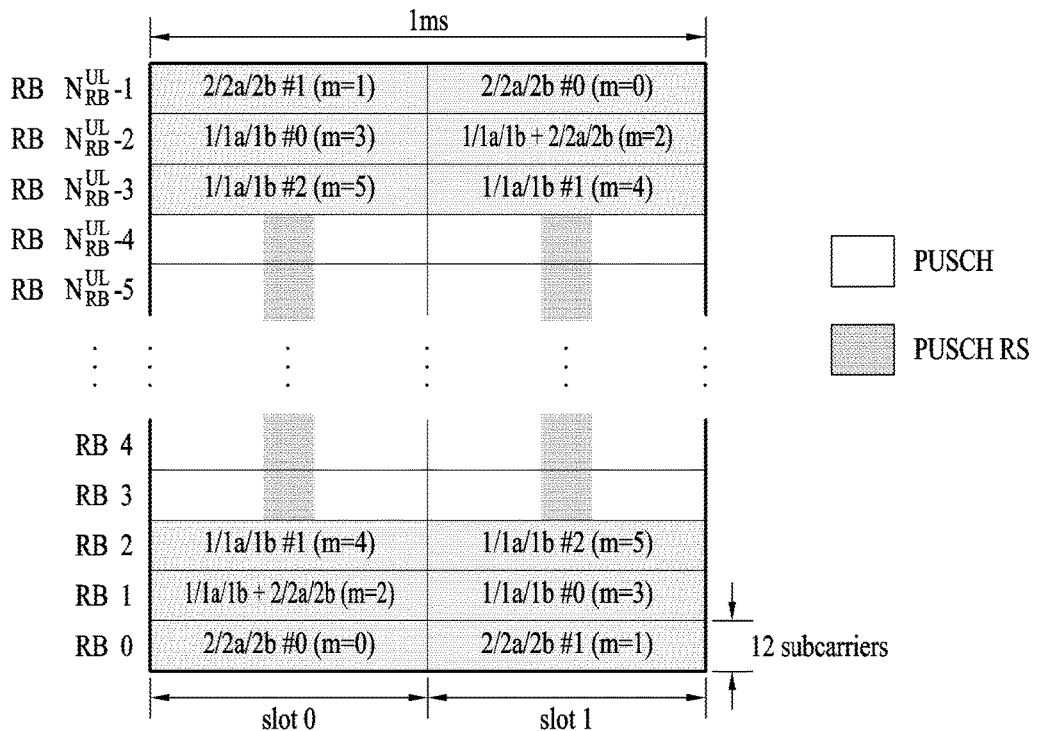
FIG. 5 illustrates mapping between UL physical resource blocks and Physical Uplink Control Channel (PUCCH) formats.

FIG. 5 illustrates mapping of PUCCH formats to PUCCH regions in UL physical resource blocks. In FIG. 5, $n_{PUCCH}^{(2)}$ denotes the number of resource blocks on UL, and 0, 1, . . . , $n_{PUCCH}^{(2)}-1$ represents physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($n_{PUCC}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
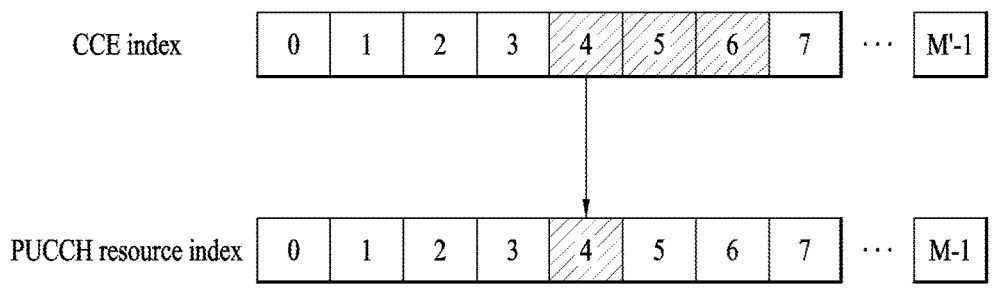
FIG. 6 illustrates exemplary determination of PUCCH resources for an Acknowledgement/Negative Acknowledgement (ACK/NACK)

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) Resource Element Groups (REGs). One REG includes four Resource Elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)}$$ [Equation 1]

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, ... N−1) having a length of N gives a result of y(0), y(1), y(2), ..., y(N−1). Symbols y(0), y(1), y(2), ..., and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a Discrete Fourier Transform (DFT) with a length of 3 is employed for shortened ACK/NACK information and a reference signal. For an extended CP, a Hadamard sequence with a length of 2 is employed for a reference signal.

Figure 7:
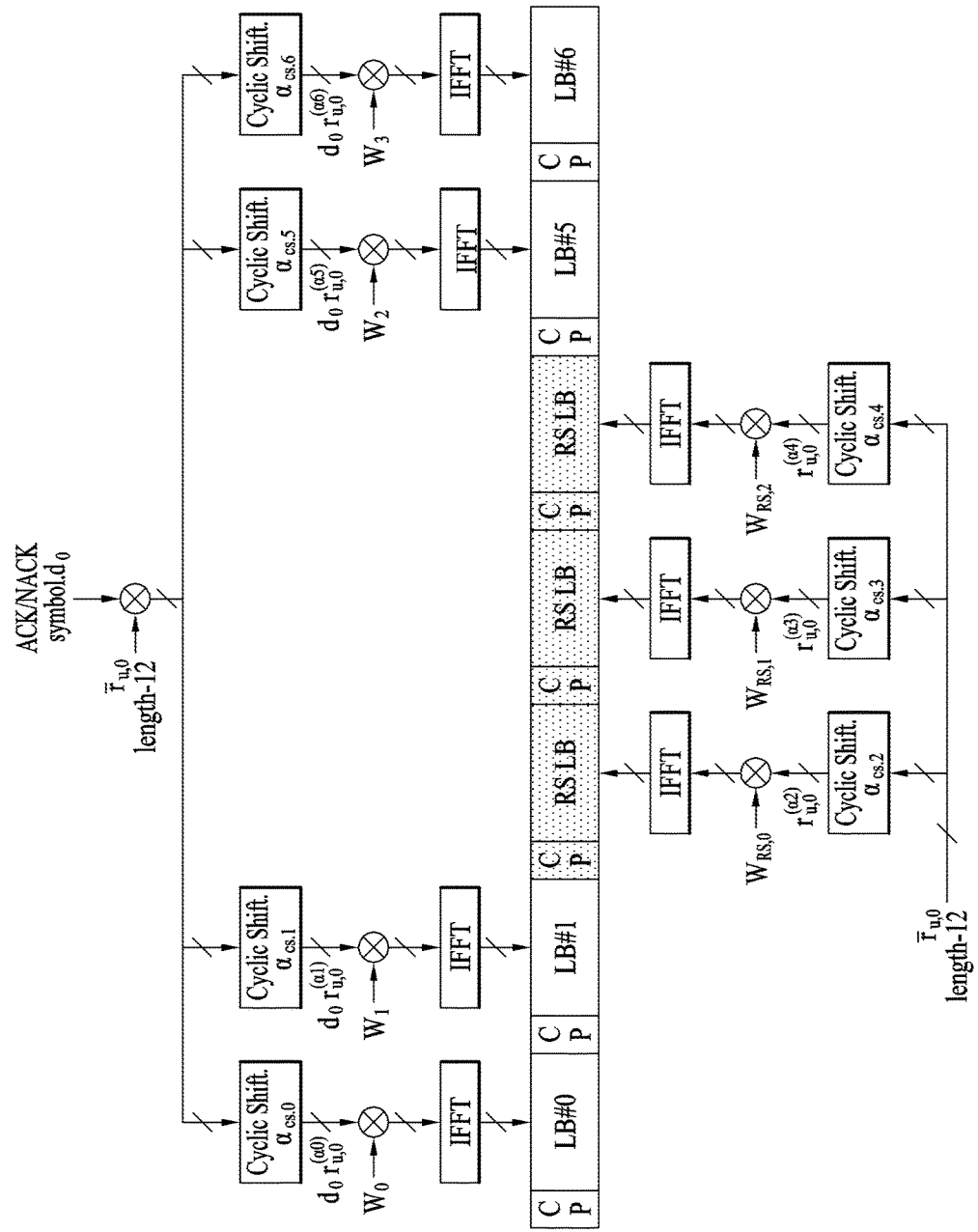
FIG. 7 illustrates a structure of an ACK/NACK channel in the case of normal Cyclic Prefix (CP)

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different Cyclic Shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as Orthogonal Covering (OC).

A plurality of UEs may be multiplexed in a Code Division Multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in [Table 2] and [Table 3]. [Table 2] shows a sequence for a symbol having a length of 4 and [Table 3] shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(\tilde{p})}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 3

| Sequence index $n_{oc}^{(\tilde{p})}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A Scheduling Request (SR) is transmitted by requesting scheduling of the UE or not requesting scheduling of the UE. An SR channel reuses an ACK/NACK channel structure in PUCCH formats 1a/1b and is configured in an On-Off Keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
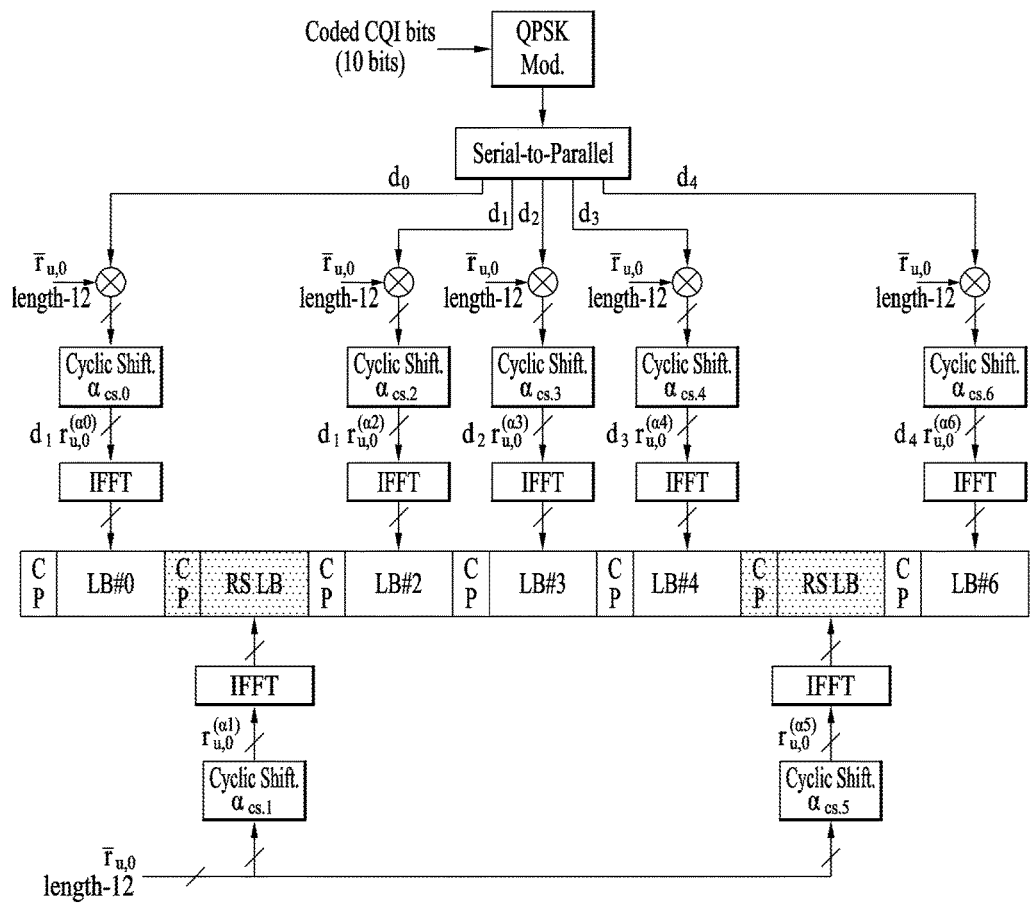
FIG. 8 illustrates a structure of a Channel Quality Indicator (CQI) channel in the case of normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a Demodulation Reference Signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $N_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Block spreading is a method of modulating a control signal using SC-FDMA, which is distinguished from the PUCCH format 1 or 2 series. As shown in FIG. 9, a symbol sequence may be spread in the time domain using an Orthogonal Cover Code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or Spreading Factor (SF)=4) in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12×2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in [Table 4].

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In [Table 4], HARQ-ACK(i) (i=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in [Table 4]. Referring to [Table 4], Discontinuous Transmission (DTX) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in [Table 4]), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in [Table 4]), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in [Table 4]) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in [Table 4]). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good Cubic Metric (CM) property or a good Peak-to-Average Power Ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Figure 10:
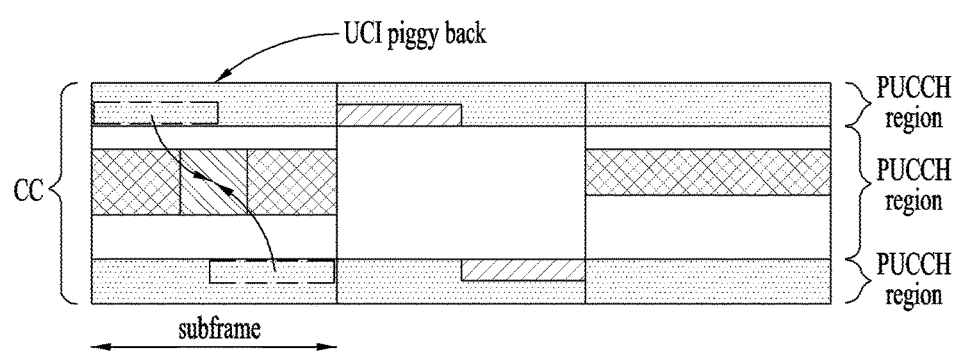
FIG. 10 illustrates a method for transmitting Uplink Control Information (UCI) on a Physical Uplink Shared Channel (PUSCH)

Thus, when PUSCH transmission takes place in the same subframe as that for PUCCH transmission as illustrated in FIG. 10, Uplink Control Information (UCI) to be transmitted on a PUCCH may be piggybacked together with data over a PUSCH in order to maintain the single carrier characteristics.

As described before, since a legacy LTE UE cannot transmit a PUCCH and a PUSCH simultaneously, UCI (a CQI/PMI, an HARQ-ACK, an RI, etc.) is multiplexed into a PUSCH region in a subframe carrying a PUSCH. For example, if a CQI and/or a PMI is to be transmitted in a subframe allocated for PUSCH transmission, control information and data may be transmitted together by multiplexing UL-SCH data with the CQI/PMI before DFT-spreading. In this case, the UL-SCH data is rate-matched in consideration of CQI/PMI resources. The control information such as an HARQ ACK, an RI, etc. may be multiplexed into the PUSCH region by puncturing the UL-SCH data.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

Figure 11:
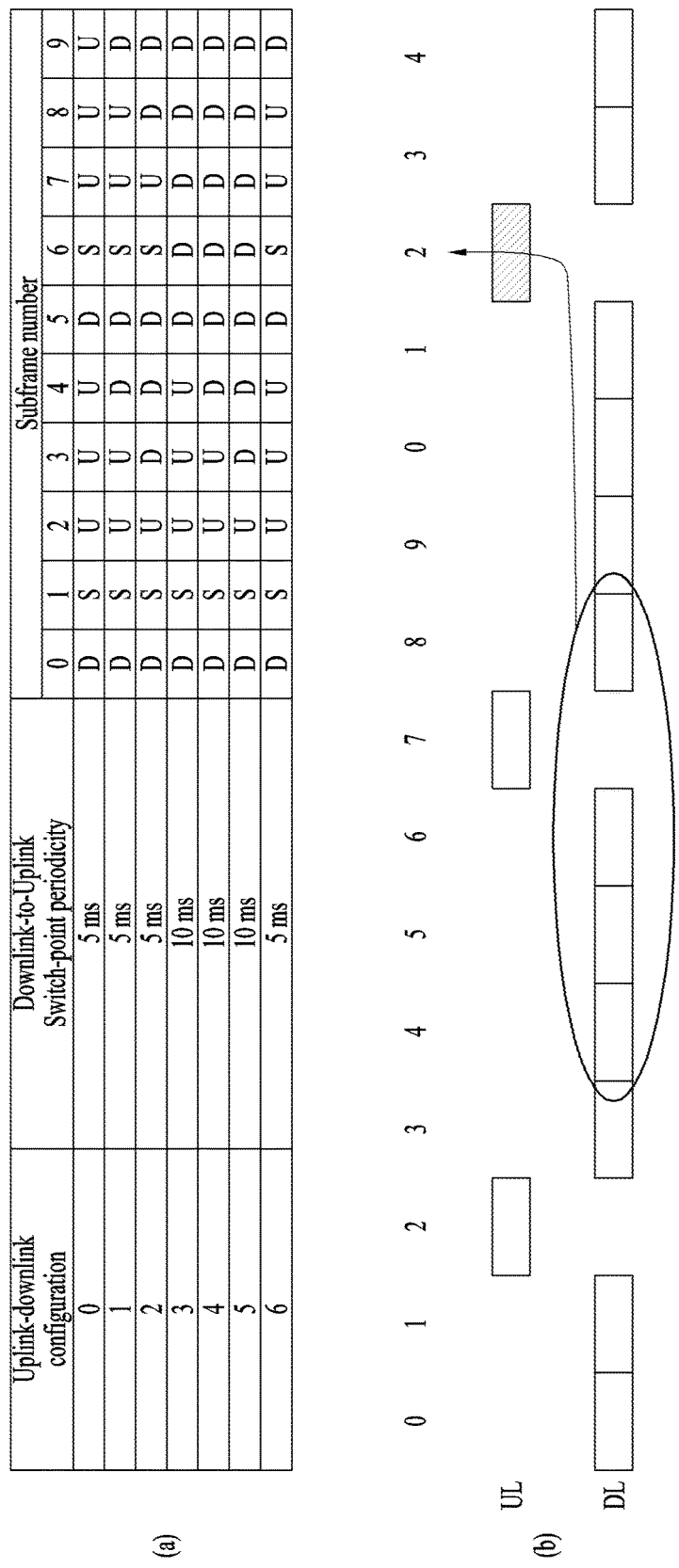
FIG. 11 illustrates an ACK/NACK in Time Division Duplex (TDD)

FIG. 11 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 11(a)) and 12 OFDM symbols in time in the case of the extended CP (see FIG. 11(b)).

In FIG. 11, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Enhanced Interference Management and Traffic Adaptation (eIMTA)

In TDD, each subframe (except for a special subframe configured for UL-DL switching) is pre-configured for use in DL or UL. Specifically, for example, referring to [Table 5] below, subframe 0 and subframe 5 are configured for DL and subframes 2, 3, 4, 7, 8 and 9 are configured for UL in one radio frame in the case of UL-DL configuration 0. A UL-DL configuration that a specific eNB will use may be indicated to a UE in a part of system information (e.g., System Information Block (SIB) 1). For a reason such as interference, adjacent eNBs may be forced to use the same TDD configuration, that is, the same UL-DL configuration.

TABLE 5

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: subframe for DL transmission, U: subframe for UL transmission, and S: special subframe)

Even though a system is operated according to UL-DL configurations as listed in [Table 5], if the amount of UL or DL transmission data increases rapidly in each cell, one or more subframes configured for UL may be used/switched for DL or one or more subframes configured for DL may be used/switched for UL, in order to enable active data transmission and thus increase efficiency.

Bolded subframes in [Table 6], [Table 7] below may be available for switched use of a UL subframe to a DL subframe. In the meantime, [Table 6] illustrates a case in which changing a switching period is allowed. If changing a switching period is not allowed, subframes available for switching for use as DL subframes are Bolded.

TABLE 6

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 7

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Further, it may be regulated that usage switching from a UL subframe to a DL subframe satisfies an existing TDD configuration. In other words, if the usage of a subframe is dynamically switched, the resulting TDD UL-DL configuration should be one of the UL-DL configurations listed in [Table 6]. In a specific example, if subframe 4 in UL-DL configuration 0 is switched to a DL subframe, subframe 9 should also be switched to a DL subframe simultaneously. In this case, it may be advantageously indicated whether a UL-DL configuration has been changed, by 1 bit.

Enhanced-PDCCH (EPDCCH)

The EPDCCH that may be transmitted in a legacy PDSCH region is under consideration as a solution to the lack of PDCCH capacity and inter-cell interference caused by Coordinated Multi-Point (CoMP), Multi-User Multiple Input Multiple Output (MU-MIMO), etc. in an LTE system beyond Release 11. Compared to the legacy CRS-based PDCCH, the EPDCCH allows for Demodulation Reference Signal (DMRS)-based channel estimation to achieve a precoding gain.

Depending on the configuration of a Physical Resource Block (PRB) pair used for EPDCCH transmission, localized EPDCCH transmission and distributed EPDCCH transmission may be defined. The localized EPDCCH transmission means that ECCEs used for one DCI transmission are contiguous in the frequency domain, and specific precoding may be used to achieve a beamforming gain. For example, the localized EPDCCH transmission may be based on as many contiguous ECCEs as determined by an aggregation level. On the contrary, the distributed EPDCCH transmission means that one EPDCCH is transmitted in PRB pairs distributed in the frequency domain. The distributed EPDCCH transmission offers a frequency diversity gain. For example, the distributed EPDCCH transmission may be based on an ECCE having 4 EREGs included in each distributed PRB pair. One or two EPDCCH PRB sets may be configured for a UE by higher-layer signaling and each EPDCCH PRB set may be used for one of the localized EPDCCH transmission and the distributed EPDCCH transmission.

To receive/acquire DCI from an EPDCCH, the UE may perform blind decoding in a similar manner to in the legacy LTE/LTE-A system. More specifically, the UE may attempt to decode (monitor) an EPDCCH candidate set for each aggregation level, with respect to DCI formats corresponding to a configured transmission mode. The EPDCCH candidate set to be monitored may be referred to as an EPDCCH UE-specific search space and this search space may be configured/set for each aggregation level. Compared to the afore-described legacy LTE/LTE-A system, aggregation levels {1, 2, 4, 8, 16, 32} are available according to a subframe type, a CP length, and the amount of available resources in a PRB pair.

If an EPDCCH is configured for a UE, the UE indexes REs included in a PRB pair set as EREGs and indexes these EREGs on an ECCE basis. The UE determines EPDCCH candidates that form a search space based on the indexed ECCEs and performs blind decoding on the determined EPDCCH candidates, thereby receiving control information. Herein, EREG and ECCE correspond to REG and CCE of the legacy LTE/LTE-A system, respectively. One PRB pair may include 16 EREGs.

EPDCCH and ACK Transmission

Upon receipt of an EPDCCH, the UE may transmit an ACK/NACK for the EPDCCH on a PUCCH. The indexes of resources for ACK/NACK transmission, that is, the indexes of PUCCH resources may be determined by the lowest of the indexes of ECCEs used for the EPDCCH transmission, similarly to [Equation 1], that is, according to the following [Equation 2].

$$n_{PUCCH\text{-}ECCE}^{(1)} = n_{ECCE} + N_{PUCCH}^{(1)}$$ [Equation 2]

In [Equation 2], $n_{PUCCH\text{-}ECCE}^{(1)}$ represents a PUCCH resource index, $n_{ECCE}$ represents the lowest of the indexes of ECCEs used for EPDCCH transmission, and $N_{PUCCH}^{(1)}$ (or $N_{PUCCH,EPDCCH}^{(1)}$) represents the starting point of PUCCH resource indexes, indicated by higher-layer signaling.

However, if a PUCCH resource index is determined unconditionally by [Equation 2], resource collision may occur. For example, if two EPDCCH PRB sets are configured, ECCE indexing is independent in each EPDCCH PRB set. Therefore, the EPDCCH PRB sets may have the same lowest ECCE index. Although this problem may be solved by setting different PUCCH resource starting points for different users, setting different PUCCH resource starting points for all users amounts to reservation of a large number of PUCCH resources, which is inefficient. Further, DCI from a plurality of users may be transmitted at the same ECCE position on an EPDCCH, as is the case with MU-MIMO. To solve the problem, HARQ-ACK Resource Offset (ARO) has been introduced. The ARO enables collision between PUCCH resources to be avoided by shifting PUCCH resources, which are determined based on the lowest of the indexes of ECCEs of an EPDCCH and a PUCCH resource starting offset indicated by higher-layer signaling, by a predetermined degree. An ARO is indicated in 2 bits of DCI format 1A/1B/1D/1/2A/2/2B/2C/2D transmitted on an EPDCCH, as illustrated in [Table 5].

TABLE 8

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

An eNB may select one of the ARO values listed in [Table 8] and indicate the selected ARO value to a specific UE in a DCI format, so that the specific UE may use the ARO value in determining PUCCH resources. The UE may detect the ARO field from its DCI format and transmit a reception response in PUCCH resources determined based on the ARO value.

Compared to FDD, UL and DL are not separated from each other in TDD. Therefore, it may occur that one UL subframe carries ACKs/NACKs for a plurality of (PDSCHs of) DL subframes. This will be described with reference to FIG. 11. FIG. 11(a) illustrates UL-DL configurations in TDD, and FIG. 11(b) illustrates an ACK/NACK in the case of TDD UL-DL configuration 2. Referring to FIG. 11, subframes available for use as UL subframes are limited to subframe 2 and subframe 7 in TDD UL-DL configuration 2. Accordingly, it is necessary to transmit ACKs/NACKs for eight DL subframes (including special subframes) in two UL subframes (subframe 2 and subframe 7). For this purpose, DL association set indexes are defined in [Table 9] below.

TABLE 9

| UL-DL config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

A DL association index set K is composed of elements $\{k_0, k_1, \ldots k_{M-1}\}$ for each UL subframe, and M (bundling window size) represents the number of DL subframes for which ACKs/NACKs are to be transmitted in the DL association index set K. In [Table 9], each number indicates the number of subframes by which a current UL subframe is spaced from a DL subframe for which the UL subframe is to carry an ACK/NACK. For example, in the case of UL-DL configuration 2, subframe 2 carries ACKs/NACKs for DL subframes earlier than subframe 2 by 8, 7, 4, and 6 subframes (i.e., subframes 4, 5, 8, and 6 of the previous subframe), as illustrated in FIG. 11(b).

Figure 12:
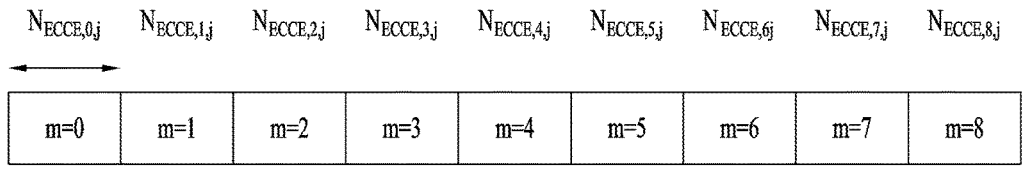
FIGS. 12 to 16 illustrate an HARQ-ACK Resource Offset (ARO) according to an embodiment of the present invention.

To transmit ACKs/NACKs for a plurality of DL subframes in one UL subframe, resources are allocated on an EPDCCH PRB set basis in such a manner that PUCCH resources are sequentially concatenated according to the order of an association set. For example, in the case of UL-DL configuration 5, for EPDCCH-PRB set j, PUCCH resource regions for subframes corresponding to an association set {13, 12, 9, 8, 7, 5, 4, 11, 6} are reserved in subframe 2, as illustrated in FIG. 12. In FIG. 12, each block is a PUCCH resource region for one of the subframes corresponding to the association set, and m represents the index of a DL subframe for which an ACK/NACK should be transmitted in subframe 2 (i.e., a sequential index in the association set {13, 12, 9, 8, 7, 5, 4, 11, 6}). For example, if m=1, this means 12 (a subframe preceding subframe 2 by 12 subframes, thus subframe 0 of the previous subframe), and $N_{eCCE,i,j}$ represents the number of ECCEs of an $i^{th}$ subframe in EPDCCH-PRB set j.

However, reservation of all of PUCCH resource regions for a plurality of DL subframes in a UL subframe as illustrated in FIG. 12 may cause waste of PUCCH resources. Therefore, large value offsets have been introduced in TDD to efficiently use PUCCH resources (to reduce actually used PUCCH resources), and AROs as listed in [Table 10] below may be used.

TABLE 10

| ACK/NACK Resource offset field in DCI format 1A/1B/1D/1/2A/2/2B/2C/2D | $\Delta_{ARO}$ |
|---|---|
| 0 | 0 |
| 1 | $-\sum_{i1=0}^{m-1} N_{ECCE,q,n-k_{i1}} - 2$ |
| 2 | $-\sum_{i1=m-\lceil m/3 \rceil}^{m-1} N_{ECCE,q,n-k_{i1}} - 1$ |
| 3 | 2 |

In [Table 10], m represents the indexes of a plurality of DL subframes for which HARQ-ACKs are transmitted in one UL subframe, and $N_{eCCE,q,n-k_{i1}}$ represents the number of ECCEs of EPDCCH PRB set q in subframe $n-k_{i1}$.

If the ACK/NACK resource offset field of [Table 10] is set to 1, the ARO value shifts a UE to an HARQ-ACK resource for the first of the plurality of DL subframes. If the ACK/NACK resource offset field is 2, the ARO value shifts the UE to an HARQ-ACK resource for a subframe preceding the UL subframe by one, two, or three subframes from among the plurality of DL subframes (the number of subframes by which the UL subframe is spaced from a DL subframe may be different according to the position of the UL subframe, and the numbers of subframes to be jumped are specified by the equations in [Table 10]). Such an ARO value that shifts the UE to a subframe makes it possible to efficiently compress PUCCH resources. Hereinafter, an ARO value enabling a shift to an HARQ-ACK resource for a first subframe will be referred to as a first large value ARO, and an ARO value enabling a shift to an HARQ-ACK resource for one of previous subframes will be referred to as a second large value ARO, for the convenience of description.

If EPDCCH PRB set q is for distributed transmission, PUCCH resources may be determined by [Equation 3], and if EPDCCH PRB set q is for localized transmission, PUCCH resources may be determined by [Equation 4].

$$n_{PUCCH}^{(1,\tilde{p}_1)} = N_{ECCE,q} + 1 + \sum_{i1=0}^{m-1} N_{ECCE,q,n-k_{i1}} + \Delta_{ARO} + N_{PUCCH,q}^{(e1)} \quad \text{[Equation 3]}$$

$$n_{PUCCH}^{(1,\tilde{p}_1)} = \left\lfloor \frac{N_{ECCE,q}}{N_{RB}^{ECCE,q}} \right\rfloor \cdot N_{RB}^{ECCE,q} + 1 + \sum_{i1=0}^{m-1} N_{ECCE,q,n-k_{i1}} + n' + \Delta_{ARO} + N_{PUCCH,q}^{(e1)} \quad \text{[Equation 4]}$$

In [Equation 3] and [Equation 4], $n_{ECCE,q}$ represents a lowest ECCE index, $N_{PUCCH,q}^{(e1)}$ represents a parameter signaled by higher-layer signaling, n' represents a value determined in relation to an antenna port, and $N_{eCCE,q,n-k_{i1}}$ represents the number of ECCEs of EPDCCH PRB set q in subframe $n-k_{i1}$.

Compression/Packing of HARQ-ACK Transmission in eIMTA

In regard to the afore-mentioned eIMTA, a legacy UE (a UE having no relation to an eIMTA configuration or a UE for which eIMTA may not be configured) and an eIMTA UE (an eIMTA-capable UE, an eIMTA-configured UE, or a UE for which an eIMTA-related message is configured) may have different HARQ timings in eIMTA. Thus, a DL reference HARQ timing may be set. That is, different HARQ timings may be set for the eIMTA UE and the legacy UE. For example, the eIMTA UE may use TDD UL-DL configuration 5 for its HARQ timing, whereas the legacy UE may use TDD UL-DL configuration 4 for its HARQ timing. In this case, especially in subframe 2, the legacy UE has a PUCCH resource order for DL subframes 12, 8, 7, and 11 as a packing order, and the eIMTA UE has a PUCCH resource order for DL subframes 13, 12, 9, 8, 7, 5, 4, 11, and 6 as a packing order. Due to the different packing orders between the legacy UE and the eIMTA UE, HARQ-ACK collision may occur. To solve the problem, a common packing order may be used between the legacy UE and the eIMTA UE, and PUCCH resources may be used separately for DL subframes not common to the legacy UE and the IMTA UE. For example, the legacy UE may follow an HAQR timing illustrated in [Table 11], and the eIMTA UE may perform packing to transmit an HARQ-ACK for a DL subframe not common to the legacy UE and the eIMTA UE according to [Table 12]. Specifically, in the above example (in which the eIMTA UE uses TDD UL-DL configuration 5 as an HARQ timing, and the legacy UE uses TDD UL-DL configuration 4 as an HARQ timing), (PUCCH resources for) DL subframes 12, 8, 7, and 11 common to the legacy UE and the eIMTA UE may be packed according to [Table 11], whereas (PUCCH resources of) DL subframes 13, 9, 5, 4, and 6 for the eIMTA UE only may be packed according to a Bolded part of [Table 12]

In this packing scheme, a packing order is changed, and an area common to a legacy UE and an eIMTA UE is separated from an area dedicated to the eIMTA UE. Also, the packing order is changed within an existing bundling window. Accordingly, an ARO (value) needs to be set. In this context, setting of first and second large value AROs (ARO values) according to an embodiment of the present disclosure will be described below. In the following description, a set including subframes common to a legacy UE and an eIMTA UE is referred to as a first subframe set (or a first window or window 1), and a set including subframes for the eIMTA UE only is referred to as a second subframe set (or a second window or window 2). A set of remaining subframes in a window of a TDD configuration used for the eIMTA UE, except for the first window may be set as the second window. In window 2, fixed DL subframes may be followed by flexible subframes. In a specific example, window 1 is composed of $\{k_0, k_1, L\ k_{M_1-1}\}$, and window 2 is composed of $\{k_0, k_1, L\ k_{M_2-1}\}$. Herein, M1 and M2 may be the sizes of window 1 and window 2, respectively.

While the following description is given mainly in the context of an ACK/NACK resource offset field being 1, this does not limit the technical features of the present invention, and the same thing is applicable to a case in which the ACK/NACK resource offset field is 2.

Embodiment 1

In the case where a UE determines PUCCH resources for a plurality of DL subframes using an ARO and transmits HARQ-ACKs through the PUCCH resources in one UL frame, the ARO may be operated as follows according to the composition of the plurality of DL subframes, or according to the relationship between a TDD UL-DL configuration and the number of the plurality of DL subframes.

If the plurality of DL subframes include only subframes of a first subframe set common to an eIMTA UE and a legacy UE, the ARO may be set on the assumption that PUCCH resources for the first subframe set and PUCCH resources for a second subframe set are contiguous. For example, a first large value ARO may shift PUCCH resource to a PUCCH resource for the first subframe of the first subframe set. If the plurality of DL subframes also include a subframe of the second subframe set for the eIMTA UE only, the ARO

TABLE 11

| UL-DL config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | | | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 12

| Higher layer parameter 'eimta-HarqReference Config-r12' | Higher layer parameter 'subframeAssignment' | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 6 | — | — | 6, 8, 4 | — | — | — | — | 8, 6, 4 | — | — |
| 4 | 0 | — | — | 12, 7, 11, 8 | 7, 4, 5, 6 | — | — | — | — | — | — |
| | 1 | — | — | 12, 8, 11 | 7, 5, 6 | — | — | — | — | — | — |
| | 3 | — | — | 12, 8 | 4, 7 | — | — | — | — | — | — |
| | 6 | — | — | 12, 11, 8 | 4, 5, 6 | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 5 | 3 | — | — | 13, 12, 5, 4, 8, 9 | — | — | — | — | — | — |
| | 4 | — | — | 13, 5, 4, 6, 9 | — | — | — | — | — | — | — |
| | 6 | — | — | 13, 12, 11, 6, 8, 4, 9, 5 | — | — | — | — | — | — | — | may also shift a PUCCH resource for the subframe of the second subframe set to the PUCCH resource for the first subframe of the first subframe set. Similarly, a second large value ARO may be set to shift the PUCCH resource to shift an HARQ-ACK resource for a previous DL subframe, on the assumption that the first and second subframe sets is one connected subframe set. Herein, the number of DL subframes by which the UE jumps according to the second large value ARO may be different according to a relative position within a window. Since it is assumed that the first and second subframe sets are one window, it may be determined that M1 DL subframes precede the relative position of an HARQ-ACK value for a subframe included in the second subframe set.

In other words, if the plurality of DL subframes include only subframes of the first subframe set common to an eIMTA-configured UE and a UE having no relation to an eIMTA configuration, the ARO may shift a PUCCH resource for a first subframe included in the first subframe set to a PUCCH resource for a subframe preceding the first subframe in the first subframe set. If the plurality of DL subframes additionally include a subframe of the second subframe set for the eIMTA-configured UE only, the ARO shifts a PUCCH resource for a second subframe included in the second subframe set to a PUCCH resource for a subframe preceding the second subframe, and when how much PUCCH resources to be shifted for the second subframe is determined, it may be considered that the second subframe set also includes the subframes of the first subframe set. Herein, if a first ARO is used, a subframe preceding the first and second subframes may be the first subframe of the first subframe set.

As large value AROs are set as described above, the use efficiency of PUCCH resources may be maximized. More specifically, for example, PUCCH resource compression may be performed only within each window, as described later. Under circumstances, resources between windows may be wasted. However, according to the foregoing embodiment, a UE may compress PUCCH resources of each window across the boundary of the window, thereby maximizing resource use efficiency.

Figure 13:
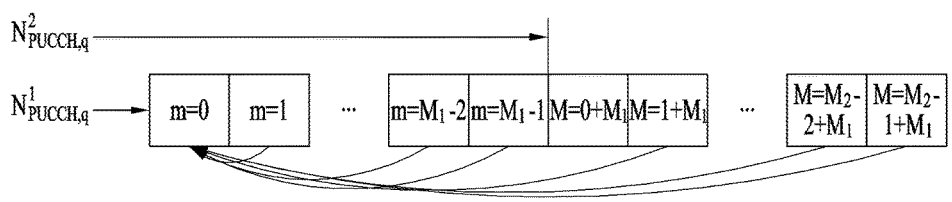

The above-described embodiment is illustrated in FIG. 12. In FIG. 12, each block represents a PUCCH resource for one of DL subframes for which ACKs/NACKs are to be transmitted in one UL subframe, and $N_{PUCCH,q}^i$ represents a starting offset of an $i^{th}$ window. Referring to FIG. 12, it may be noted that two windows (two subframe sets) are regarded as one continuous window. As illustrated in FIG. 12, in regard to the first window, a first large value ARO shifts a PUCCH resource for a specific DL subframe (e.g., m=M1−2) to a PUCCH resource for the first subframe of the first window. Also in the second window, an ARO shifts a PUCCH resource for a specific DL subframe (e.g., M=1+M1) to the PUCCH resource for the first subframe of the first window. That is, the ARO of the second window adds the size M1 of the first window to its subframe order. Thus, a large window is assumed, in which the second window is contiguous to the first window. In other words, in FIG. 13, it is assumed that PUCCH areas for the two windows are contiguous, and PUCCH resources for the second window are set to be shifted to PUCCH resource for the first subframe of the first window by adding M1 to m.

If the two windows are not contiguous $$\left( N_{PUCCH,q}^2 \neq N_{PUCCH,q}^1 + \sum_{i=0}^{M_1-1} N_{ECCE,i} \right),$$

Figure 14:
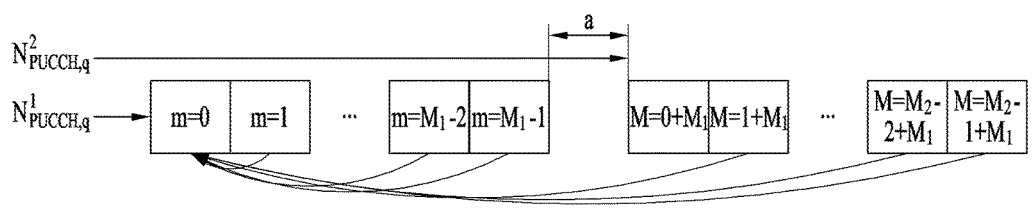

-continued $$a = N_{PUCCH,q}^1 + \sum_{i=0}^{M_1-1} N_{ECCE,i} - N_{PUCCH,q}^2$$

may be additionally subtracted from the ARO of the second window so that an ARO may not indicate a discontinuous area in a different window. FIG. 14 illustrates an embodiment for a case in which the starting offset of a second window is not contiguous to PUCCH areas for a first window.

In the embodiment, an ARO may be set for each of the first and second subframe sets. Or different AROs may be set for the first and second subframe sets. That is, an ARO set for the first subframe set and an ARO set for the second subframe set may be parameters defined to be different, although the same effect (shifting PUCCH resources to a PUCCH resource for the first subframe) is achieved.

Embodiment 2

Figure 15:
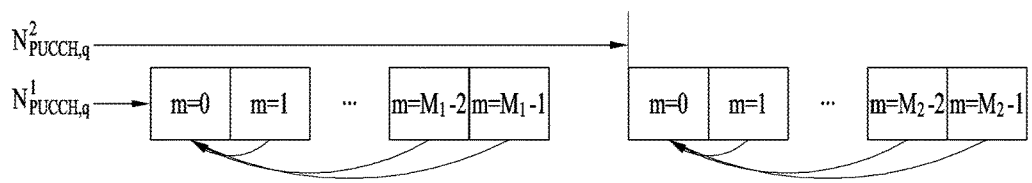

An eIMTA UE may set two HARQ ACK transmission windows for transmitting HARQ ACKs and set a large value ARO on a window basis. That is, a large value ARO may be set according to the order m of subframes in each window. FIG. 15 illustrates an example of the second embodiment. As illustrated in FIG. 15, a first large value ARO is set for each window. The first large value ARO shifts PUCCH resources to a PUCCH resource for the first subframe of the window.

Embodiment 3

Figure 16:
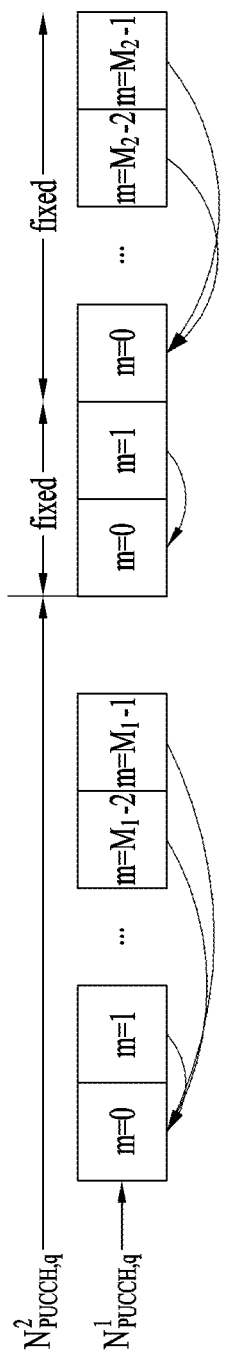

In Embodiment 3, first and second windows are defined, and the second window is further branched in consideration of characteristics of eIMTA. More specifically, the second window may be divided into fixed subframes and flexible subframes, and a large value ARO may be defined according to a subframe order in each window. That is, the second window may be divided into two windows, and a large value ARO may be applied according to a subframe order in each of the windows. FIG. 16 illustrates Embodiment 3, and is based on the assumption that a UE confirms an ACK/NACK resource offset field set to 1 in DCI. Therefore, when a first large value ARO is applied, a PUCCH resource for a specific subframe may be shifted to a PUCCH resource for the first subframe in each of the three windows.

Configurations of Apparatuses According to Embodiment of the Present Invention

FIG. 17 is a block diagram of a transmission point and a UE according to an embodiment of the present invention.

Referring to FIG. 17, a transmission point 10 according to the present invention may include a Reception (Rx) module 11, a Transmission (Tx) module 12, a processor 13, a memory 14, and a plurality of antennas 15. Use of the plurality of antennas 15 means that the transmission point 10 supports Multiple Input and Multiple Output (MIMO) transmission and reception. The Rx module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 17 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 17 is applicable to a relay as a DL transmitter or a UL receiver, and the description of the UE 20 in FIG. 17 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

The invention claimed is:

1. A method for transmitting a Hybrid Automatic Repeat Request Acknowledgement (HARQ-ACK) in a wireless communication system, the method comprising:
   determining Physical Uplink Control Channel (PUCCH) resources for a plurality of downlink subframes, using an HARQ-ACK Resource Offset (ARO); and
   transmitting HARQ-ACKs through the PUCCH resources in one uplink subframe,
   wherein if the plurality of downlink subframes includes only subframes of a first subframe set common to an enhanced Interference Mitigation and Traffic Adaptation (eIMTA) User Equipment (UE) and a non-eIMTA UE, the ARO shifts a PUCCH resource for a first subframe included in the first subframe set to a PUCCH resource for a subframe preceding the first subframe, and
   wherein if the plurality of downlink subframes also includes a subframe of a second subframe set for the eIMTA UE only, the ARO shifts a PUCCH resource for a second subframe included in the second subframe set to a PUCCH resource for a subframe preceding the second subframe, and when the amount of PUCCH resources to be shifted for the second subframe is determined, the second subframe set is considered to include the subframes of the first subframe.

2. The method according to claim 1, wherein the ARO is set for each of the first subframe set and the second subframe set.

3. The method according to claim 1, wherein different AROs are set for the first and second subframe sets.

4. The method according to claim 1, wherein PUCCH resources for the first subframe set and PUCCH resources for the second subframe set are contiguous.

5. The method according to claim 1, wherein if the plurality of downlink subframes include only subframes of the first subframe set common to the eIMTA UE and the non-eIMTA UE, the ARO is $$-\sum_{i1=0}^{m-1} N_{eCCE,q,n-k_{i1}} - 2$$

where m represents the indexes of the plurality of downlink subframes, and $N_{eCCE,q,n-k_{i1}}$ represents the number of Enhanced Control Channel Elements (ECCEs) of Enhanced Physical Downlink Control Channel (EPDCCH)-Physical Resource Block (PRB) set q in subframe $n-k_{i1}$, and $n-k_{i1}$ is a subframe index.

6. The method according to claim 1, wherein the PUCCH resources are determined using a lowest of the indexes of ECCEs in an EPDCCH.

7. A User Equipment (UE) for transmitting a Hybrid Automatic Repeat Request Acknowledgement (HARQ-ACK) in a wireless communication system, the UE comprising:
 a receiver; and
 a processor,
 wherein the processor is configured to determine Physical Uplink Control Channel (PUCCH) resources for a plurality of downlink subframes, using an HARQ-ACK Resource Offset (ARO), and transmit HARQ-ACKs through the PUCCH resources in one uplink subframe,
 wherein if the plurality of downlink subframes includes only subframes of a first subframe set common to an enhanced Interference Mitigation and Traffic Adaptation (eIMTA) UE and a non-eIMTA UE, the ARO shifts a PUCCH resource for a first subframe included in the first subframe set to a PUCCH resource for a subframe preceding the first subframe, and
 wherein if the plurality of downlink subframes also includes a subframe of a second subframe set for the eIMTA UE only, the ARO shifts a PUCCH resource for a second subframe included in the second subframe set to a PUCCH resource for a subframe preceding the second subframe, and when the amount of PUCCH resources to be shifted for the second subframe is determined, the second subframe set is considered to include the subframes of the first subframe.

8. The UE according to claim 7, wherein the ARO is set for each of the first subframe set and the second subframe set.

9. The UE according to claim 7, wherein different AROs are set for the first and second subframe sets.

10. The UE according to claim 7, wherein PUCCH resources for the first subframe set and PUCCH resources for the second subframe set are contiguous.

11. The UE according to claim 7, wherein if the plurality of downlink subframes include only subframes of the first subframe set common to the eIMTA UE and the non-eIMTA UE, the ARO is $$-\sum_{i1=0}^{m-1} N_{ECCE,q,n-k_{i1}} - 2$$

where m represents the indexes of the plurality of downlink subframes, and $N_{eCCE,q,n-k_{i1}}$ represents the number of Enhanced Control Channel Elements (ECCEs) of Enhanced Physical Downlink Control Channel (EPDCCH)-Physical Resource Block (PRB) set q in subframe $n-k_{i1}$, and $n-k_{i1}$ is a subframe index.

12. The UE according to claim 7, wherein the PUCCH resources are determined using a lowest of the indexes of ECCEs in an EPDCCH.

* * * * *